9723X
L. E. Babcock,
Mortising Machine.
Patented June 16, 1836.
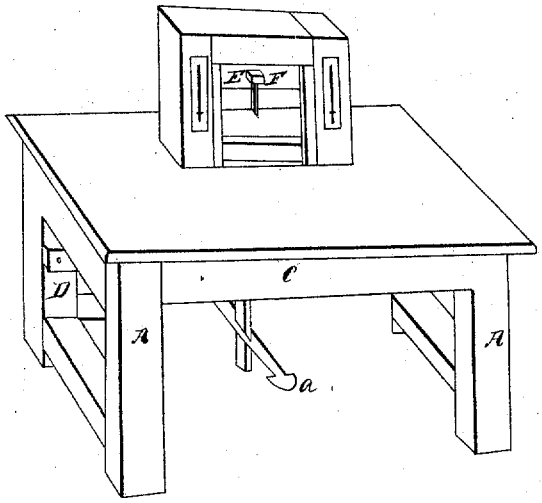
AM. PHOTO-LITHO. CO. N.Y. (OSBORNE'S PROCESS)

Lemuel E Babcock
Letters Patent

The Schedule referred to in these Letters Patent and making
part of the same containing a description in the words of the said
Lemuel E. Babcock himself of his improvement in the
machine for Mortising Timber.
To all to whom these presents
shall come Be it known that I Lemuel E Babcock of
Alstead in the County of Cheshire and State of New hamp
shire have invented a new and useful improvement in the useful
arts being a machine for mortising holes or openings in timber
and that the following is a full and exact description there-
of. reference being had to the annexed drawings. Fig 1 a pers-
pective view of the machine. the frame of which is made of
timber three inches square, and put together in the usual
way with mortises and tenons, being three feet long one foot
six inches wide and two feet four inches high and is compo-
sed of eleven ^pieces^ viz. four posts A. four eight rails B. two at the
top and two near the bottom of the posts A. and two long
rails C. connecting the posts at the top. also one long rail
through the centre of the top connecting the two upper short
rails. Midway between the top and bottom short rails of the
frame a long rail is attached to the back posts by means
of bolts see D. The top of this frame is covered with thick
hard wood board which is made fast with screws. Through
this board a hole is cut against the back of the middle rail
one foot four inches long and three inches wide. Through
this opening two fender posts are placed being made of
timber three inches square and are made fast at the lower
end to the rail D with bolts. These fender posts are conne
ted at the top by a timber of the same size and ten inches long
Between these posts which are made fast to the middle
rail rail of the machine. the gate B. two feet long and ten inches wide and made of timber two inches thick plays up and down in grooves in the fender posts. To the lower end of this gate a swoop is attached which reaches down to the lever E. passing through a mortise in the lever and is made fast with a pin. This lever is made fast to the roller B. which turns between the back standards of the machine. the lever being three feet long and crosses the roller at right angles at the back end of the lever a weight is attached to throw up the gate. C. is a head block of iron set on the upper cross piece of the gate and is made fast at any situation required by a set screw d. in a round hole in this head block c is made fast by means of the set screw £. Operation. place the timber on the table of the machine against the fender posts and the foot on the lever forcing it down and the chisel into the timber. then by raising the foot the weight on the opposite end of the lever will throw up the gate, throwing the chisel out of the timber by repeating the same operation the mortise may be cut to the required length Witnesses Samuel E Babcock
Ansel Oliver
Emily Babcock Drawings (600 [illegible]

ch/16